(12) United States Patent
Vakharwala et al.

(10) Patent No.: US 10,817,447 B2
(45) Date of Patent: Oct. 27, 2020

(54) INPUT/OUTPUT TRANSLATION LOOKASIDE BUFFER (IOTLB) QUALITY OF SERVICE (QOS)

(71) Applicant: Intel Corporation, Santa Clara, CA (US)

(72) Inventors: Rupin H. Vakharwala, Hillsboro, OR (US); Camron B. Rust, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 833 days.

(21) Appl. No.: 15/350,998

(22) Filed: Nov. 14, 2016

(65) Prior Publication Data
US 2018/0137069 A1    May 17, 2018

(51) Int. Cl.
*G06F 13/28*     (2006.01)
*G06F 12/1027*   (2016.01)
*G06F 12/1081*   (2016.01)
*G06F 9/4401*    (2018.01)

(52) U.S. Cl.
CPC ............ *G06F 13/28* (2013.01); *G06F 9/4401* (2013.01); *G06F 12/1027* (2013.01); *G06F 12/1081* (2013.01); *G06F 2212/1041* (2013.01); *G06F 2212/15* (2013.01); *G06F 2212/502* (2013.01); *G06F 2212/651* (2013.01)

(58) Field of Classification Search
CPC .......... G06F 13/28; G06F 9/44; G06F 9/4401; G06F 12/1027; G06F 12/1081; G06F 2212/1041; G06F 2212/15; G06F 2212/661; G06F 2212/502
See application file for complete search history.

(56) References Cited

U.S. PATENT DOCUMENTS

| 9,594,717 B2 * | 3/2017 | Davis ................. G06F 11/0709 |
| 2003/0097394 A1 * | 5/2003 | Chauvel ............... G06F 9/5016 718/100 |
| 2008/0222338 A1 * | 9/2008 | Balasubramanian ....................... G06F 9/5061 710/306 |

(Continued)

OTHER PUBLICATIONS

International Search Report and Written Opinion dated Jan. 24, 2018 for International Application No. PCT/US2017/056541, 15 pages.

*Primary Examiner* — Henry Tsai
*Assistant Examiner* — Christopher A Daley
(74) *Attorney, Agent, or Firm* — Schwabe, Williamson & Wyatt, P.C.

(57) ABSTRACT

Embodiments of the present disclosure may be related to an electronic device that includes a root complex; and a processor coupled with the root complex. The root complex may identify a first direct memory access (DMA) transaction and a second DMA transaction respectively related to a first task and a second task of a device communicatively coupled with the root complex through an input/output (I/O) fabric. The root complex may further cache a first memory translation related to the first DMA transaction in a first micro translation lookaside buffer (uTLB) of the root complex. The root complex may further cache a second memory translation related to the second DMA transaction in a second uTLB of the root complex. Other embodiments may be described and/or claimed.

19 Claims, 4 Drawing Sheets

(56) References Cited

U.S. PATENT DOCUMENTS

| | | | |
|---|---|---|---|
| 2010/0080272 A1* | 4/2010 | Kwa | G06F 1/3209 |
| | | | 375/222 |
| 2011/0029710 A1* | 2/2011 | Matthews | G06F 1/24 |
| | | | 710/311 |
| 2012/0159039 A1 | 6/2012 | Kegel et al. | |
| 2014/0281067 A1* | 9/2014 | Das Sharma | G06F 13/385 |
| | | | 710/104 |
| 2014/0365704 A1* | 12/2014 | Yousuf | G06F 13/1694 |
| | | | 710/308 |
| 2015/0067296 A1 | 3/2015 | Basu et al. | |
| 2015/0220409 A1* | 8/2015 | Shao | G06F 13/4022 |
| | | | 714/4.5 |
| 2016/0034407 A1 | 2/2016 | Shankar | |
| 2018/0107608 A1* | 4/2018 | Kaplan | G06F 3/0622 |

\* cited by examiner

INPUT/OUTPUT TRANSLATION LOOKASIDE BUFFER (IOTLB) QUALITY OF SERVICE (QOS)

FIELD

Embodiments of the present disclosure generally relate to the field of memory architecture and, more particularly, to translation look aside buffer (TLB) architecture.

BACKGROUND

In electronic devices the input/output (I/O) memory management unit (collectively, IOMMU) may provide address translation for direct memory access (DMA) transactions from devices to protect the platform memory. For example, the IOMMU may receive a DMA transaction from a device that includes a memory address, look up a corresponding memory address in platform memory, and translate the memory address from the DMA transaction to the memory address in platform memory. To improve performance of the system, the IOMMU may build a cache of recent memory address translations, which may be referred to as an I/O TLB (IOTLB). Furthermore, to improve quality of service (QoS) observed by various devices, some entries of the IOTLB may be dedicated for use by a specific device.

However, in some cases a given device may need a larger translation cache than IOTLB is able to provide; or the device may need to partition the translation cache into multiple sub-pieces, each dedicated to a certain task/engine so that the task/engines can work independently to improve QoS. In this case, additional cache entries or improved QoS may be achieved by embedding, in the device, a TLB (which may also be referred to as a DeviceTLB and/or an Address Translation Cache (ATC) as described in a peripheral component interconnect express (PCIe)-Address Translation Service (ATS) specification). The DeviceTLB may be used in conjunction with ATS supported by in the root complex. However, information related to task/engine may be lost once the device outputs a DMA transaction on a PCIe bus

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure relate to an electronic device that includes an IOTLB with a plurality of logically independent uTLBs. A device may be configured to access the plurality of logically independent uTLBs. Specifically, the device may embed a group-identifier (ID) in upper address bits of a direct memory access (DMA) transaction. The root complex, and particularly the IOTLB, may extract this group-ID and identify a specific uTLB with which the DMA transaction should be associated. In some embodiments, the IOTLB may use additional information related to the device to identify the uTLB. For example, the IOTLB may use a device-identifier such as a bus/device/function (BDF) identifier, a virtual channel (VC) associated with the device, and/or a traffic class (TC) associated with the device.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first layer formed, deposited, or otherwise disposed on a second layer" may mean that the first layer is formed, deposited, grown, bonded, or otherwise disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
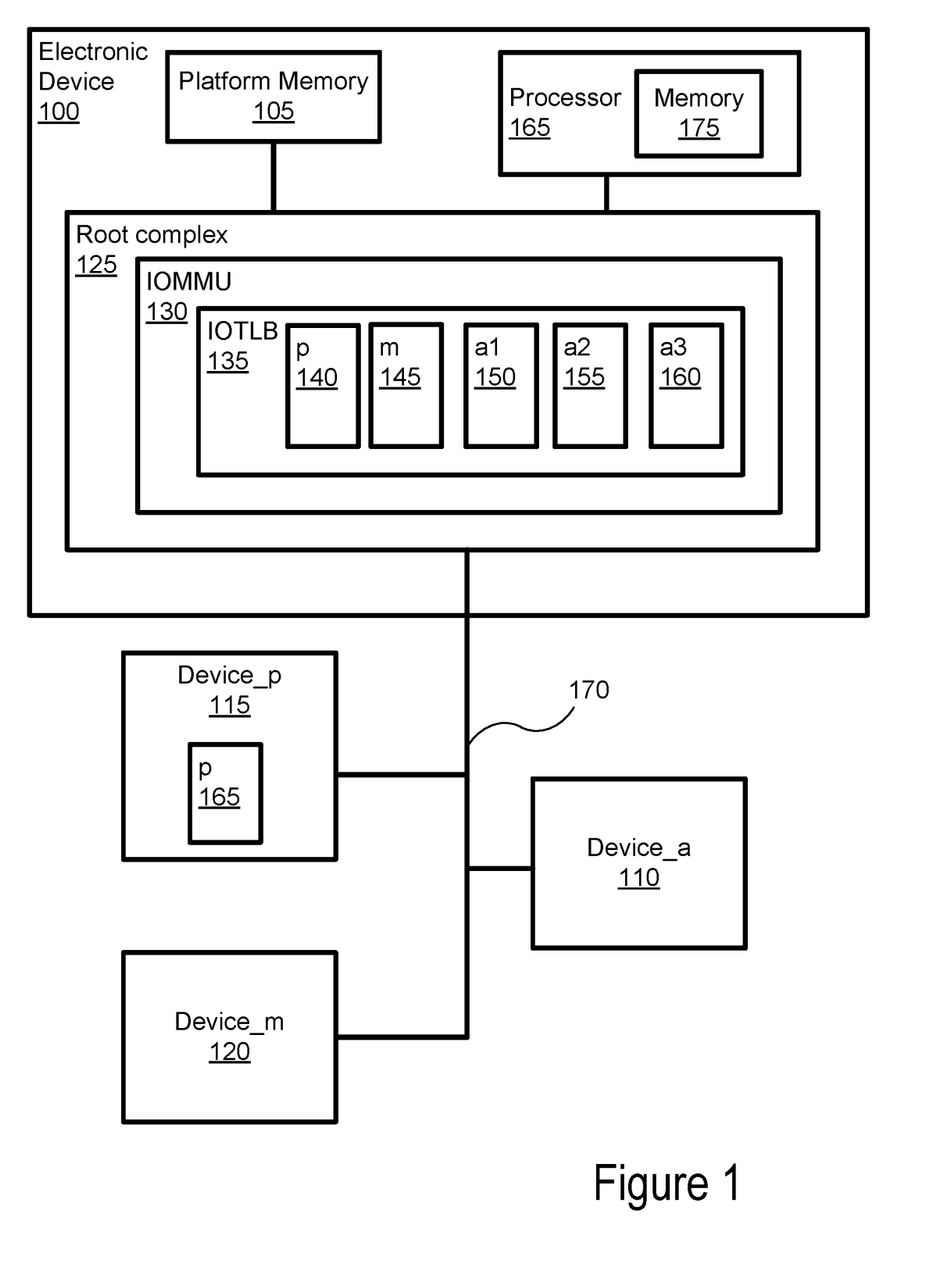
FIG. 1 illustrates an example electronic device with a micro TLB (uTLB) architecture, in accordance with various embodiments.

FIG. 1 illustrates an example electronic device 100. In embodiments, the electronic device 100 may include a platform memory 105 and a processor 165, both of which may be coupled with a root complex 125. The electronic device 100 may be coupled with a plurality of devices such as Device_p 115, Device_m 120, and Device_a 110. In embodiments, the electronic device 100 may be coupled with the devices 115, 120, and 110 through an I/O fabric 170 such as a PCIe bus.

In some embodiments, the processor 165 may be a single or multi-core processor. For example, the processor 165 may be a central processing unit (CPU) or some other type of processor. In embodiments, the processor 165 may include a memory 175 which may be a non-volatile memory such as a read-only memory (ROM). In embodiments, the memory 175 may be a complimentary metal-oxide semiconductor (CMOS) memory that may, for example, include a basic I/O system (BIOS). The BIOS may be built-in software that may determine what the electronic device 100 may be able to do without accessing programs from an alternative memory such as platform memory 105 and/or some other type of memory.

The platform memory 105 may be a storage memory such as a random access memory (RAM), a dynamic random access memory (DRAM), a synchronized dynamic random access memory (SDRAM), and/or a dual data rate (DDR) SDRAM such as a DDR SDRAM, DDR2 SDRAM, DDR3 SDRAM, DDR4 SDRAM, single data rate (SDR) SDRAM, etc.

The devices 115, 120, and/or 110 may be devices that may be able to perform the role of a requester and/or a completer of a PCIe transaction. Generally, a device may refer to a peripheral or on-board device such as a disk drive, a printer, a mouse, a modem, an Ethernet device, a universal serial bus (USB), a graphics device, and/or some other type of device. As shown in FIG. 1, the devices 115, 120, and 110 are depicted as being separate from the electronic device 100, but in other embodiments one or more of the devices may be an element of the electronic device. Additionally, although FIG. 1 is only shown as having three devices coupled with the root complex 125, in other embodiments the root complex 125 may be coupled with more or less devices via one or more PCIe buses.

As used herein, a "requester" may refer to a device that is able to originate a transaction in a PCIe fabric. A "completer" may refer to a device that is addressed and/or targeted by a requester. A "transaction" may refer to a DMA transaction. The DMA transaction may refer to a transaction that is able to transfer data between a platform memory such as platform memory 105 and a device such as devices 115/120/110 without routing the data and/or request through a processor of the electronic device 100 such as processor 165. These transactions may go through the root complex 125.

In some embodiments, it may be desirable for the devices 115, 120, or 110 to have direct access to the platform memory 105. For example, the devices 115, 120, and 110 may not be "trusted" devices, and therefore such direct access may be viewed as a security risk. In these embodiments, as noted above, a memory management of the root complex such as the IOMMU 130 may provide address translation for DMA transactions between the devices 115, 120, or 110 and the platform memory 105. For example, the root complex 125 may receive a DMA transaction from Device_p 115. The DMA transaction may relate to a specific task of the device. For example, if the device is a mouse, then the DMA transaction may relate to a movement of the mouse, a mouse click, or some other task. The DMA transaction may have a memory address that may be composed of 48 bits, 57 bits, or some other number of bits. In some embodiments, the memory address may also include additional "filler" bits so that the total length of the memory address is 64 bits.

The IOMMU 130 may then perform a translation from the memory address identified in the DMA transaction to a corresponding address of the platform memory 105. In some embodiments, the memory address identified in the DMA transaction may be different from the corresponding address of the platform memory 105. Sometimes, this translation may take up to four separate memory lookups. Therefore, it may be undesirable to have to repeatedly perform the memory lookups each time a DMA transaction is received that includes a given memory address, because doing so may result in undesirable memory overhead and system performance degradation.

To improve performance of the system and reduce this overhead, the IOMMU 130 may build a cache of recent memory address translations, which may be referred to as an IOTLB 135. The IOTLB 135 may include a plurality of separate uTLBs, wherein each uTLB may be dedicated to a specific device. For example, uTLB p 140 may be dedicated for use by Device_p 165. uTLB m 145 may be dedicated for use by Device_m 120.

A uTLB may be identified by the IOMMU 130 as associated with one of the devices based on a unique identifier of the device such as a bus/device/function (BDF) identifier or some other identifier. Additionally or alternatively, a uTLB may be identified by the IOMMU 130 as associated with one of the devices based on a traffic class (TC) of data of the device. Generally, a TC may be a number that is assigned by an application and/or driver of the device. Packets with different TCs may move through the I/O fabric 170 with different priorities. Additionally or alternatively, a uTLB may be identified by the IOMMU 130 as associated with one of the devices based on a virtual channel (VC) associated with the device. A VC may be a channel implemented in switches, the devices, and/or the root complex 125.

In some embodiments, as described above, a device may need multiple groups of TLBs, and therefore a DeviceTLB such as DeviceTLB p 165 may be embedded in a device such as Device_p 115. Through use of a DeviceTLB, a device may be able to cache an additional number of memory translations.

However, the above described system as illustrated in FIG. 1 may introduce some concerns in legacy systems. For example, the uTLBs may, in legacy systems, typically be associated with a single device that may have a plurality of tasks. Conversely, each device may only have a single uTLB in the IOTLB in legacy systems. Each task of the device may require a different number of lookups, and may occur with greater or lesser frequency, than other tasks of the device. However, when one task completes, the information in a given TLB may be considered to be "stale," and the entire TLB may be invalidated or wiped, regardless of whether another task may be ongoing. As such, the memory lookups and caching related to the ongoing task may need to be re-performed.

Additionally, as noted above the use of the root complex may provide a layer of security for the electronic device 100 by preventing a device from directly accessing the platform memory 105. By storing the DeviceTLB on-board a given device, that security may be compromised.

However, embodiments herein may address the above described concerns by including a plurality of uTLBs for a given device. Specifically, the IOTLB 135 may include a plurality of logically independent uTLBs such as uTLBs a1 150, a2 155, and a3 160. The uTLBs 150, 155, and 160 may each by dedicated for use by Device_a 110.

Some systems may support host address bits up to 48 bits, 57 bits, etc. Thus although devices such as Device_a 110 may implement a full 64 bits of address, the upper 7 bits are usually "0" and the device may overload these address bits with a group identifier (group-ID). The IOMMU 130 may extract this group-ID and use the group-ID in conjunction with information such as a BDF identifier, a VC, and/or a TC to identify which of the plurality of uTLBs to use for a given DMA transaction. Although the identifier is described herein as a group-ID, in other embodiments the group-ID may also be referred to as a uTLB-ID.

In some embodiments, this identification may require the root complex 125 and/or the IOMMU 130 to differentiate between a bad device that generated a DMA transaction beyond a permitted address space (e.g., a DMA transaction with an address longer than the described 48 bits, 57 bits, etc.). In some embodiments, such DMA transactions and/or devices may be identified based on a criterion such as a whitelist of BDFs stored in the root complex 125. An additional/alternative criterion might include a white-list of an internal identifier that may identify an authorized device. This internal identifier may be related to a name of a device, a type of the device, or some other criterion. In other embodiments, an additional/alternative criterion might include a single bit addition to the DMA transaction that indicates to the IOMMU 130 to use upper address bits of the DMA transaction as a group-ID.

In some embodiments, the group-ID may not be indicated solely using upper address bits of a DMA transaction. In some embodiments, the group-ID may be indicated in the DMA transaction based on a function of the group-ID and other data. For example, the DMA transaction may include a function of the group-ID and an identifier such as a BDF, a VC, and/or a TC. In embodiments wherein the DMA transaction includes a function such as f(BDF, group-ID), a given device may be able access 2^N uTLBs where N indicates the unused upper address bits of the DMA transaction.

Additionally and/or alternatively, in some embodiments a group-ID may be added as a new wire to the I/O fabric. In other words, the I/O fabric 170 may be modified to include an additional wire over which an indication of the group-ID may be transmitted. This embodiment may be desirable in situations where the DMA transaction utilizes the full 64 address bits. The embodiments described herein where a single device such as Device_a 110 may access a plurality of uTLBs such as uTLBs a1 150, a2 155, and a3 160 may provide significant benefits of legacy electronic devices.

For example, Device_a 110 may have a first task that may touch many pages in memory. This task may repeatedly miss a designated TLB, and hence bring in many new translations into the TLB, which in turn may evict older translations from the TLB. Device_a 110 may also have a second task that may touch a relatively small number of pages in memory and can consistently hit in a reasonably sized TLB. If Device_a 110 has a single uTLB shared by the first and the second tasks, then translations for the first task would end up evicting translations for the second task from the shared uTLB, thereby degrading the performance of second task. However, by limiting the translation fills from the first task into uTLB a1 150, and translation fills from the second task into uTLB a2 155, embodiments herein may significantly reduce and/or eliminate impact from the first task to the second task and, thereby achieving a better quality of service for the second task and improving overall performance.

Additionally, if Device_a 110 is allowed to access multiple uTLBs in the IOTLB 135, then Device_a 110 may not include a DeviceTLB such as p 165. Rather, the translations that would normally be stored in the DeviceTLB may be cached in one of uTLBs a1 150, a2 155, or a3 160. By keeping the memory translations in the IOTLB 135 rather than in a DeviceTLB, the security of the electronic device 100 may be increased since Device_a 110 may not have access to a host physical address.

Notably, as described above, uTLBs dedicated to one device may be inaccessible to other devices. For example, memory translations related to Device_p 115 and Device_m 120 may not be cacheable in uTLBs a1 150, a2 155, or a3 160. Similarly, memory translations related to Device_a 110 may not be cacheable in uTLBs p 150 or m 145. Additionally, in some embodiments the size of the various uTLBs may be pre-configured in the root complex 125, however association of a specific task with a given uTLB may be indicated by software of the device.

Figure 2:
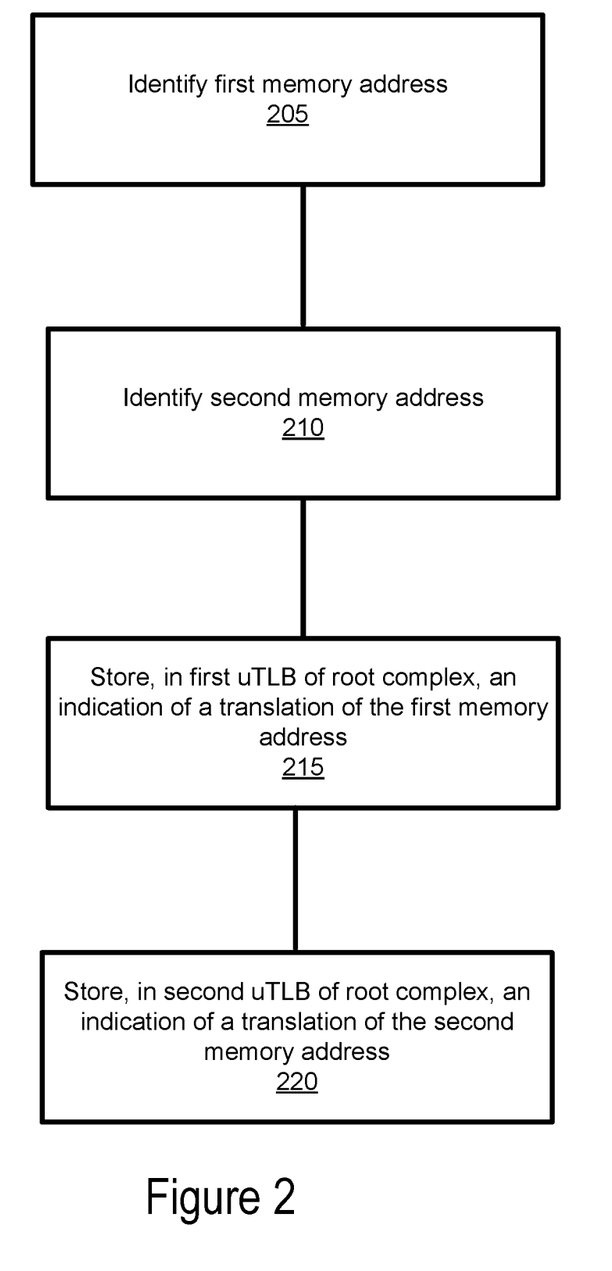
FIG. 2 illustrates an example process flow related to use of the uTLB architecture of FIG. 1, in accordance with various embodiments.

FIG. 2 depicts an example procedure by which the uTLBs of the electronic device 100 may be used. Generally, the procedure may be performed by the root complex 125, and specifically by the IOMMU 130. In some embodiments, the procedure may be performed at the direction of the processor 165, and particularly the BIOS. In some embodiments, the memory 175 may store the instructions to perform the procedure of FIG. 2. In other embodiments, the instructions to perform the procedure of FIG. 2 may additionally or alternatively be stored on platform memory 105.

Although descriptions herein may describe tasks in terms of a "first" task or a "second" task, it will be understood that the terms first and second may not necessarily imply a sequential order in time (e.g., the first task necessarily occurs before the second task). Rather, the terms "first" and "second" may be used as indicators to differentiate between the two tasks. For example, the first task may occur subsequent to, or at the same time as, the second task.

The procedure may include identifying a memory address of a memory transaction associated with a first task of a device at 205. For example, the memory address may be an address of a DMA transaction as described above. The DMA transaction may be associated with a first task of a device such as Device_a 110.

The procedure may then include identifying a memory address of a memory transaction associated with a second task of the device at 210. Similarly, the memory address may be an address of a DMA transaction associated with a second task of a device such as Device_a 110. For example, in embodiments where Device_a 110 is a mouse, the first task may be associated with a "left-click" of the mouse, and the second task may be associated with a "right-click" of the mouse.

The procedure may then include at block 215 caching, in a uTLB such as uTLB a1 150, an indication of a translation from the memory address of the DMA transaction associated with the first task to a memory address of a platform memory such as platform memory 105. For example, in some embodiments the indication may be in the form of one or more lookup tables, or some other architecture identifying both the memory address of the DMA transaction and the memory address of the platform memory. In some embodiments the indication may be in the form of a function or some other technique through which one memory address may be derived from the other.

The procedure may also include at block 220 caching, in a uTLB such as uTLB a2 155, an indication of a translation from the memory address associated with the second task to a memory address of a platform memory such as platform memory 105.

It will be understood that the above described procedure is shown as being linear, however in other embodiments the order of elements may be switched, or some elements may be performed in parallel with one another. As a non-limiting example, element 215 may be performed prior to, or in parallel with, element 210.

Figure 4:
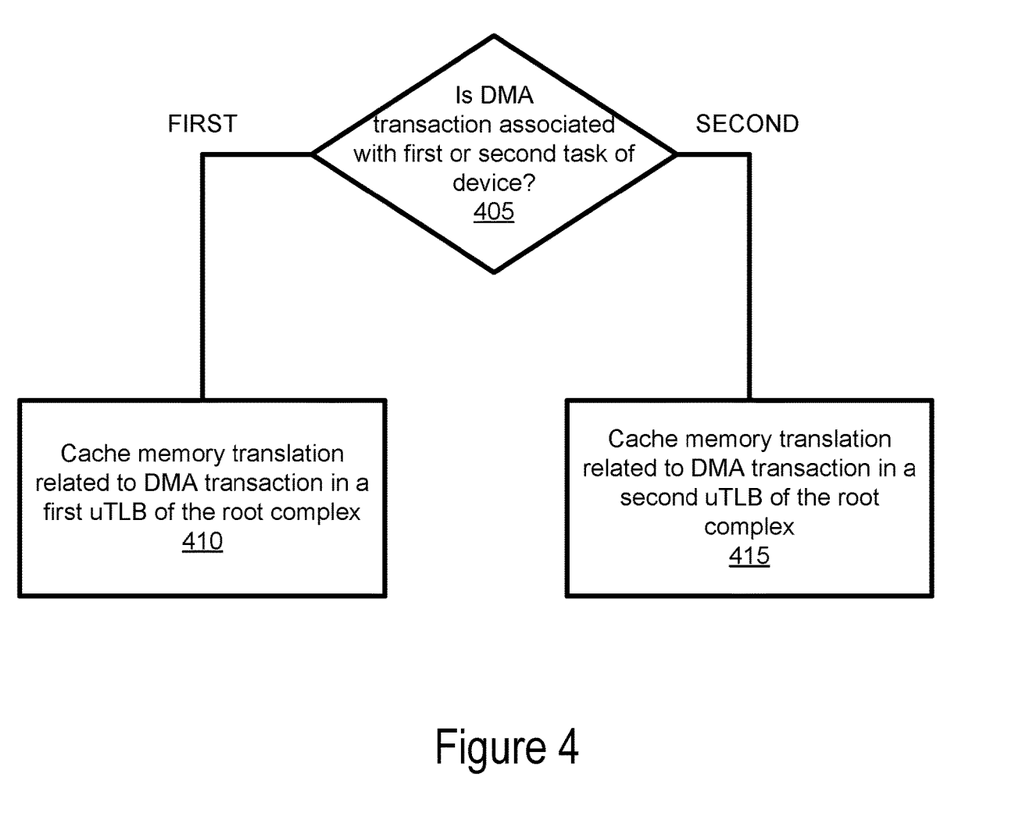
FIG. 4 illustrates an alternative example process flow related to use of the uTLB architecture of FIG. 1, in accordance with various embodiments.

FIG. 4 illustrates an alternative example process flow related to use of the uTLB architecture of FIG. 1, in accordance with various embodiments. The process flow of FIG. 4 may be considered complimentary to the flow depicted in FIG. 2, and may for example inform the actions described with respect to elements 215 and/or 220. Similarly to FIG. 2 the procedure may be performed by the root complex 125, and specifically by the IOMMU 130. In some embodiments, the procedure may be performed at the direction of the processor 165, and particularly the BIOS. In some embodiments, the memory 175 may store the instructions to perform the procedure of FIG. 2. In other embodiments, the instructions to perform the procedure of FIG. 2 may additionally or alternatively be stored on platform memory 105.

In embodiments, the process may include identifying whether a DMA transaction is associated with a first task or a second task of a device at 405. For example, the root complex 125 and/or the IOMMU 130 may receive a DMA transaction from a device such as Device_a 110. The DMA transaction may relate to a task of the device such as (in the case of a mouse) a click, a movement of the mouse, etc. As described above, identifying whether the DMA transaction is related to a first task or second task may be based on a uTLB identifier (uTLB-ID) in upper address bits of the first DMA transaction. Identifying whether the DMA transaction is related to the first task or second task may further be based on information in the DMA transaction such as a unique ID of the device, a virtual channel (VC) associated with the device, or a traffic class (TC) associated with the device.

If the root complex 125 and/or the IOMMU 130 identify that the DMA transaction is related to a first task of the device, then the root complex 125 and/or the IOMMU 130 may cache a memory translation or an indication of a memory translation related to that DMA transaction in a first uTLB of the root complex at 410. Alternatively, if the root complex 125 and/or the IOMMU identify that the DMA transaction is related to a second task of the device, then the root complex 125 and/or the IOMMU 130 may cache the memory translation (or indication of the memory translation) in a second uTLB of the root complex at 415. For example, the first uTLB may be uTLB a1 150, and the second uTLB may be uTLB a2 155.

Figure 3:
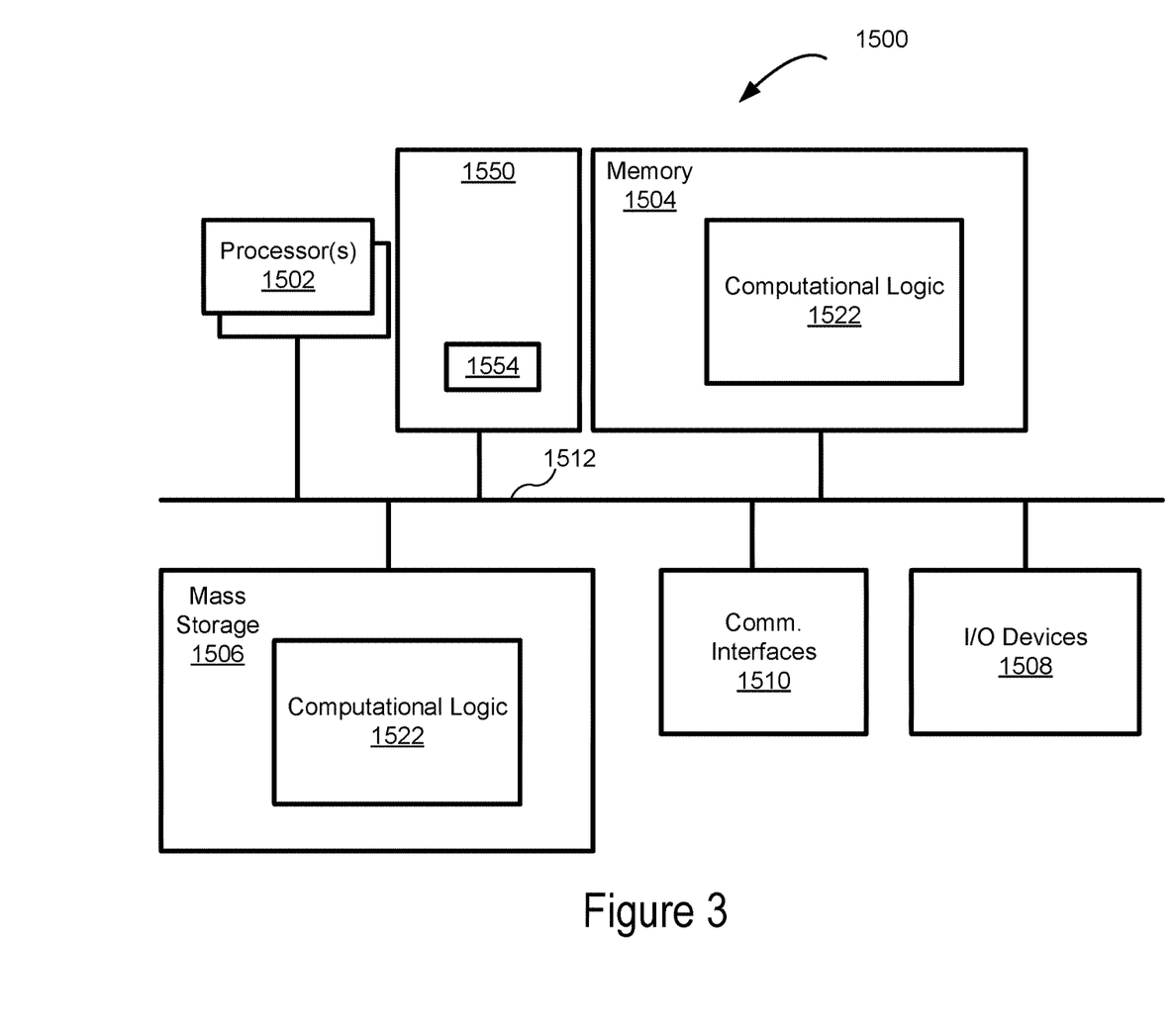
FIG. 3 schematically illustrates an example computing device, in accordance with some embodiments.

FIG. 3 illustrates an example computing device 1500 suitable for use with various components of FIG. 1. As shown, computing device 1500 may include one or more processors or processor cores 1502 and system memory 1504. The processor(s) 1502 may be similar to processor 165, and the system memory 1504 may be similar to platform memory 105. For the purpose of this application, including the claims, the terms "processor" and "processor cores" may be considered synonymous, unless the context clearly requires otherwise. The processor 1502 may include any type of processors, such as a central processing unit (CPU), a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., dynamic random-access memory (DRAM), compact disc read-only memory (CD-ROM), digital versatile disk (DVD), and so forth). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 1500 may further include I/O devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth). I/O devices 1508 and/or communication interfaces 1510 may be similar, for example, to Device_p 115, Device_m 120, and/or Device_a 110 of FIG. 1.

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. In particular, system memory 1504 and mass storage devices 1506 may be employed to store a working copy and a permanent copy of the programming instructions for the operation of various components of computer system 1500, including but not limited to an operating system of computer system 1500 and/or one or more applications. The various elements may be implemented by assembler instructions supported by processor(s) 1502 or high-level languages that may be compiled into such instructions.

The permanent copy of the programming instructions may be placed into mass storage devices 1506 in the factory, or in the field through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1504 may include computational logic 1522 configured to implement various firmware and/or software services associated with operations of the computing device 1500. For some embodiments, at least one of processors 1502 may be packaged together with computational logic 1522 configured to practice aspects of embodiments described herein to form a System in Package (SiP) or a System on Chip (SoC).

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

EXAMPLES

Example 1 may include an apparatus comprising: a root complex; and a processor coupled with the root complex, the processor with instructions thereon that, when executed by the processor, cause the root complex to: identify a direct memory access (DMA) transaction received from a device; identify whether the DMA transaction is associated with a first task or a second task of the device; if the DMA transaction is associated with the first task, cache a memory translation related to the DMA transaction in a first micro translation lookaside buffer (uTLB) of the root complex; and if the DMA transaction is associated with the second task, cache the memory translation in a second uTLB of the root complex.

Example 2 may include the apparatus of example 1, wherein the memory translation is related to a translation of an address of the DMA transaction to an address of a platform memory coupled with the root complex.

Example 3 may include the apparatus of example 2, wherein an I/O memory management unit (IOMMU) of the root complex is to generate the memory translation.

Example 4 may include the apparatus of any of examples 1-3, wherein the instructions are received from a basic input/output system (BIOS).

Example 5 may include the apparatus of any of examples 1-3, wherein the root complex is to identify whether the DMA transaction is associated with the first task or the second task based on a uTLB identifier (uTLB-ID) in upper address bits of the first DMA transaction.

Example 6 may include the apparatus of example 5, wherein the root complex is further to identify whether the DMA transaction is associated with the first task or the second task based on a unique ID of the device, a virtual channel (VC) associated with the device, or a traffic class (TC) associated with the device.

Example 7 may include the apparatus of any of examples 1-3, wherein the device is a first device, and wherein the first and second uTLBs are inaccessible to a second device coupled with the root complex through the I/O fabric.

Example 8 may include one or more non-transitory computer-readable media comprising instructions to cause a root complex of an electronic device to: identify a first memory address of a first memory transaction associated with a first task of a device coupled with the root complex; identify a second memory address of a second memory transaction associated with a second task of the device; cache, in a first micro translation lookaside buffer (uTLB) of the root complex, a first indication of a translation from the first memory address of the first memory transaction to a first memory address of a platform memory coupled with the root complex; and cache, in a second uTLB of the root complex, a second indication of a translation from the second memory address of the second memory transaction to a second memory address of the platform memory.

Example 9 may include the one or more non-transitory computer-readable media of example 8, wherein the device is coupled with the root complex through an input/output (I/O) fabric.

Example 10 may include the one or more non-transitory computer-readable media of example 8, wherein the first memory transaction is a direct memory access (DMA) transaction.

Example 11 may include the one or more non-transitory computer-readable media of any of examples 8-10, wherein the instructions are further to cause an input/output memory management unit (IOMMU) to translate the first memory address of the first memory transaction to the first memory address of the platform memory.

Example 12 may include the one or more non-transitory computer-readable media of any of examples 8-10, wherein the instructions are to store the first indication based on a uTLB identifier (uTLB-ID) in upper address bits of the first memory address of the first memory transaction.

Example 13 may include the one or more non-transitory computer-readable media of example 12, wherein the instructions are further to store the first indication based on a unique ID of the device, a virtual channel (VC) associated with the device, or a traffic class (TC) associated with the device.

Example 14 may include the one or more non-transitory computer-readable media of any of examples 8-10, wherein the device is a first device, and wherein the first and second uTLBs are inaccessible to a second device coupled with the root complex.

Example 15 may include a root complex to: identify a first direct memory access (DMA) transaction related to a first task of a device coupled with the root complex through an input/output (I/O) fabric; identify a second DMA transaction related to a second task of the device; cache a first memory translation related to the first DMA transaction in a first micro translation lookaside buffer (uTLB) of the root complex; and cache a second memory translation related to the second DMA transaction in a second uTLB of the root complex.

Example 16 may include the root complex of example 15, wherein the first memory translation is related to a translation of an address of the first DMA transaction to an address of a platform memory coupled with the root complex.

Example 17 may include the root complex of example 16, wherein an I/O memory management unit (IOMMU) of the root complex is to perform the first memory translation and the second memory translation.

Example 18 may include the root complex of any of examples 15-17, wherein the logic is to associate the first memory translation with the first uTLB based on a uTLB identifier (uTLB-ID) in upper address bits of the first DMA transaction.

Example 19 may include the root complex of example 18, wherein the logic is further to associate the first memory translation with the first uTLB based on a unique ID of the device, a virtual channel (VC) associated with the device, or a traffic class (TC) associated with the device.

Example 20 may include the root complex of any of examples 15-17, wherein the first uTLB and the second uTLB are inaccessible to another device coupled with the root complex through the I/O fabric.

Example 21 may include an apparatus comprising: means to identify a first memory address of a first memory transaction associated with a first task of a device coupled with a root complex of an electronic device; means to identify a second memory address of a second memory transaction associated with a second task of the device; means to cache, in a first micro translation lookaside buffer (uTLB) of the root complex, a first indication of a translation from the first memory address of the first memory transaction to a first memory address of a platform memory coupled with the root complex; and means to cache, in a second uTLB of the root complex, a second indication of a translation from the second memory address of the second memory transaction to a second memory address of the platform memory.

Example 22 may include the apparatus of example 21, wherein the device is coupled with the root complex through an input/output (I/O) fabric.

Example 23 may include the apparatus of example 21, wherein the first memory transaction is a direct memory access (DMA) transaction.

Example 24 may include the apparatus of any of examples 21-23, further comprising means to cause an input/output memory management unit (IOMMU) to translate the first memory address of the first memory transaction to the first memory address of the platform memory.

Example 25 may include the apparatus of any of examples 21-23, further comprising means to store the first indication based on a uTLB identifier (uTLB-ID) in upper address bits of the first memory address of the first memory transaction.

Example 26 may include the apparatus of example 25, further comprising means to store the first indication based on a unique ID of the device, a virtual channel (VC) associated with the device, or a traffic class (TC) associated with the device.

Example 27 may include the apparatus of any of examples 21-23, wherein the device is a first device, and wherein the first and second uTLBs are inaccessible to a second device coupled with the root complex.

Example 28 may include an apparatus comprising means to perform one or more elements of a method described in or related to any of examples 1-27, or any other method or process described herein.

Example 29 may include one or more non-transitory computer-readable media comprising instructions to cause an electronic device, upon execution of the instructions by one or more processors of the electronic device, to perform one or more elements of a method described in or related to any of examples 1-27, or any other method or process described herein.

Example 30 may include an apparatus comprising logic, modules, and/or circuitry to perform one or more elements of a method described in or related to any of examples 1-27, or any other method or process described herein.

Example 31 may include a method, technique, or process as described in or related to any of examples 1-27, or portions or parts thereof.

Example 32 may include an apparatus comprising: one or more processors and one or more computer readable media comprising instructions that, when executed by the one or more processors, cause the one or more processors to perform the method, techniques, or process as described in or related to any of examples 1-27, or portions thereof.

Example 33 may include a method of communicating in a wireless network as shown and described herein.

Example 34 may include a system for providing wireless communication as shown and described herein.

Example 35 may include a device for providing wireless communication as shown and described herein.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

We claim:

1. An apparatus comprising:
   a root complex; and
   a processor coupled with the root complex, the processor with instructions thereon that, when executed by the processor, cause the root complex to:
   identify a direct memory access (DMA) transaction received from a device coupled with the root complex via an input/output (I/O) fabric;
   identify whether the DMA transaction is associated with a first task or a second task of the device;
   if the DMA transaction is associated with the first task, cache a memory translation related to the DMA transaction in a first micro translation lookaside buffer (uTLB) of the root complex; and
   if the DMA transaction is associated with the second task, cache the memory translation in a second uTLB of the root complex.

2. The apparatus of claim 1, wherein the memory translation is related to a translation of an address of the DMA transaction to an address of a platform memory coupled with the root complex.

3. The apparatus of claim 2, wherein an I/O memory management unit (IOMMU) of the root complex is to generate the memory translation.

4. The apparatus of claim 1, wherein the instructions are received from a basic input/output system (BIOS).

5. The apparatus of claim 1, wherein the root complex is to identify whether the DMA transaction is associated with the first task or the second task of the device, based on a uTLB identifier (uTLB-ID) in upper address bits of the first DMA transaction.

6. The apparatus of claim 5, wherein the root complex is further to identify whether the DMA transaction is associated with the first task or the second task of the device, based on a unique ID of the device, a virtual channel (VC) associated with the device, or a traffic class (TC) associated with the device.

7. The apparatus of claim 1, wherein the device is a first device, and wherein the first and second uTLBs are inaccessible to a second device coupled with the root complex through the I/O fabric.

8. One or more non-transitory computer-readable media comprising instructions to cause a root complex of an electronic device, in response to execution of the instructions by a processor of the electronic device, coupled with the root complex, to:
identify a first memory address of a first direct memory access (DMA) transaction associated with a first task of a device coupled with the root complex via an input/output (I/O) fabric;
identify a second memory address of a second DMA transaction associated with a second task of the device;
cache, in a first micro translation lookaside buffer (uTLB) of the root complex, a first indication of a translation from the first memory address of the first DMA transaction to a first memory address of a platform memory coupled with the root complex; and
cache, in a second uTLB of the root complex, a second indication of a translation from the second memory address of the second DMA transaction to a second memory address of the platform memory.

9. The one or more non-transitory computer-readable media of claim 8, wherein the input/output (I/O) fabric is a peripheral component interconnect express (PCIe) bus.

10. The one or more non-transitory computer-readable media of claim 8, wherein the instructions are further to cause an input/output memory management unit (IOMMU) to translate the first memory address of the first DMA transaction to the first memory address of the platform memory.

11. The one or more non-transitory computer-readable media of claim 8, wherein the instructions are to store the first indication based on a uTLB identifier (uTLB-ID) in upper address bits of the first memory address of the first memory transaction.

12. The one or more non-transitory computer-readable media of claim 11, wherein the instructions are further to store the first indication based on a unique ID of the device, a virtual channel (VC) associated with the device, or a traffic class (TC) associated with the device.

13. The one or more non-transitory computer-readable media of claim 8, wherein the device is a first device, and wherein the first and second uTLBs are inaccessible to a second device coupled with the root complex via the I/O fabric.

14. A root complex to facilitate access to platform memory coupled with the root complex and a processor:
identify a first direct memory access (DMA) transaction related to a first task of a device coupled with the root complex through an input/output (I/O) fabric;
identify a second DMA transaction related to a second task of the device;
cache a first memory translation related to the first DMA transaction in a first micro translation lookaside buffer (uTLB) of the root complex; and
cache a second memory translation related to the second DMA transaction in a second uTLB of the root complex.

15. The root complex of claim 14, wherein the first memory translation is related to a translation of an address of the first DMA transaction to an address of the platform memory.

16. The root complex of claim 15, wherein an I/O memory management unit (IOMMU) of the root complex is to perform the first memory translation and the second memory translation.

17. The root complex of claim 14, wherein to cache the first memory translation related to the first DMA transaction in the first uTLB comprises logic is to associate the first memory translation with the first uTLB based on a uTLB identifier (uTLB-ID) in upper address bits of the first DMA transaction.

18. The root complex of claim 17, wherein to cache the first memory translation related to the first DMA transaction in the first uTLB further comprises to associate the first memory translation with the first uTLB based on a unique ID of the device, a virtual channel (VC) associated with the device, or a traffic class (TC) associated with the device.

19. The root complex of claim 14, wherein the first uTLB and the second uTLB are inaccessible to another device coupled with the root complex through the I/O fabric.

* * * * *